(12) United States Patent
Pignataro et al.

(10) Patent No.: US 10,749,710 B2
(45) Date of Patent: Aug. 18, 2020

(54) SERVICE OFFLOAD OR BYPASS INITIATED BY A SERVICE FUNCTION FORWARDER IN A SERVICE FUNCTION CHAINING NETWORK

(71) Applicant: Cisco Technology, Inc., San Jose, CA (US)

(72) Inventors: Carlos M. Pignataro, Cary, NC (US); Frank Brockners, Köln (DE); Shwetha Subray Bhandari, Bangalore (IN); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/231,247

(22) Filed: Dec. 21, 2018

(65) Prior Publication Data
US 2020/0145255 A1  May 7, 2020

(30) Foreign Application Priority Data
Nov. 2, 2018 (IN) .............................. 201841041527

(51) Int. Cl.
*H04L 12/46* (2006.01)
*H04L 12/54* (2013.01)
(Continued)

(52) U.S. Cl.
CPC .......... *H04L 12/4633* (2013.01); *H04L 12/56* (2013.01); *H04L 45/741* (2013.01); *H04L 2012/5625* (2013.01)

(58) Field of Classification Search
CPC ... H04L 12/4633; H04L 12/56; H04L 12/935; H04L 29/06; H04L 45/741;
(Continued)

(56) References Cited

U.S. PATENT DOCUMENTS

2016/0112337 A1* 4/2016 Zhang ..................... H04L 47/17
370/237
2016/0315819 A1 10/2016 Dara et al.
(Continued)

OTHER PUBLICATIONS

Deering et al., "Internet Protocol, Version 6 (IPv6) Specification," Dec. 1998, RFC 2460, The Internet Society, Reston, VA, USA (thirty-nine pages).
(Continued)

*Primary Examiner* — Khoa Huynh
(74) *Attorney, Agent, or Firm* — The Law Office of Kirk D. Williams

(57) ABSTRACT

In one embodiment, a service function forwarder (SFF) analyzes pre-service state and post-service state of an original packet to determine whether to initiate and perform service offload or service bypass. A service function forwarder (SFF) receives a particular packet having a service function chain (SFC) encapsulation of the original packet, the SFC encapsulation identifying a particular service function path (SFP) designating a particular service function (SF). The SFF extracts pre-service state of the original packet, typically adding it to the particular packet in an In-Situ Operations, Administration, and Maintenance (IOAM) data field (or alternatively storing locally) before sending the particular packet to the particular SF. The SFF receives the particular packet after the SF applies the particular network service. In response to analyzing pre-service state and post-service state by the SFF, the SFF may perform service bypass or service offload for subsequently received packets identifying the same particular SFP.

20 Claims, 7 Drawing Sheets

(51) Int. Cl.
*H04L 12/749* (2013.01)
*H04L 12/70* (2013.01)

(58) Field of Classification Search
CPC ............ H04L 2012/5625; H04L 45/306; H04L 47/17; H04L 47/20
See application file for complete search history.

(56) References Cited

U.S. PATENT DOCUMENTS

| | | | |
|---|---|---|---|
| 2016/0315850 A1 | 10/2016 | Dara et al. | |
| 2016/0315921 A1 | 10/2016 | Dara et al. | |
| 2016/0352629 A1* | 12/2016 | Wang | H04L 45/306 |
| 2017/0317936 A1* | 11/2017 | Swaminathan | H04L 47/20 |
| 2017/0339072 A1 | 11/2017 | Pignataro et al. | |

OTHER PUBLICATIONS

Deering et al., "Internet Protocol, Version 6 (IPv6) Specification," Jul. 2017, RFC 8200, The Internet Society, Reston, VA, USA (forty-two pages).
Carpenter et al., "Transmission and Processing of IPv6 Extension Headers," Dec. 2013, RFC 7045, The Internet Society, Reston, VA, USA (ten pages).
Elkins et al., "IPv6 Performance and Diagnostic Metrics (PDM) Destination Option," Sep. 2017, RFC 8250, The Internet Society, Reston, VA, USA (thirty pages).
Brockners et al., "Requirements for In-situ OAM," Mar. 13, 2017, draft-brockners-inband-oam-requirements-03, The Internet Society, Reston, VA, USA (twenty-four pages).
Brockners et al., "Data Fields for In-situ OAM," Jul. 2, 2017, draft-brockners-inband-oam-data-07, The Internet Society, Reston, VA, USA (twenty-nine pages).
Brockners et al., "Encapsulations for In-situ OAM Data," Jul. 2, 2017, draft-brockners-inband-oam-transport-05, The Internet Society, Reston, VA, USA (thirty pages).
Brockners et al., "Geneve encapsulation for In-situ OAM Data," Jun. 27, 2018, draft-brockners-ippm-ioam-geneve-01, The Internet Society, Reston, VA, USA (ten pages).
Brockners et al., "VXLAN-GPE Encapsulation for In-situ OAM Data," Jun. 27, 2018, draft-brockners-ippm-ioam-vxlan-gpe-01, The Internet Society, Reston, VA, USA (ten pages).
Brockners et al., "Data Fields for In-situ OAM," Oct. 30, 2017, draft-ietf-ippm-ioam-data-01, The Internet Society, Reston, VA, USA (twenty-nine pages).
Brockners et al., "Data Fields for In-situ OAM," Jun. 27, 2018, draft-ietf-ippm-ioam-data-03, The Internet Society, Reston, VA, USA (thirty-five pages).
Song and Zhou, "In-situ OAM Data Type Extension," Apr. 16, 2018, draft-song-ippm-ioam-data-extension-01, The Internet Society, Reston, VA, USA (seven pages).
Bhandari et al., "In-situ OAM IPv6 Options," Jun. 29, 2018, draft-ioametal-ippm-6man-ioam-ipv6-options-00, The Internet Society, Reston, VA, USA (nine pages).
Weis et al., "GRE Encapsulation for In-situ OAM Data," Mar. 3, 2018, draft-weis-ippm-ioam-gre-00, The Internet Society, Reston, VA, USA (nine pages).
Ali et al., "Operations, Administration, and Maintenance (OAM) in Segment Routing Networks with IPv6 Data plane (SRv6)," Jul. 2, 2018, draft-ali-spring-srv6-oam-01.txt, The Internet Society, Reston, VA, USA (twenty-eight pages).

Previdi et al., "IPv6 Segment Routing Header (SRH)," Mar. 13, 2017, draft-ietf-6man-segment-routing-header-06, The Internet Society, Reston, VA, USA (thirty-five pages).
Baker and Bonica, "IPv6 Hop-by-Hop Options Extension Header," Mar. 16, 2016, draft-ietf-6man-hbh-header-handling-03, The Internet Society, Reston, VA, USA (ten pages).
Filsfils et al, "IPv6 Segment Routing Header (SRH)," Jun. 28, 2018, draft-ietf-6man-segment-routing-header-14, The Internet Society, Reston, VA, USA (twenty-nine pages).
"In-band OAM for IPv6," IPv6 Network Management Configuration Guide, Cisco IOS Release 15M&T, Jan. 26, 2018, Cisco Systems, Inc., San Jose, CA (thirty-six pages).
IPv6 Network Management Configuration Guide, Cisco IOS Release 15M&T, Nov. 21, 2012, Cisco Systems, Inc., San Jose, CA (ninety-six pages).
"Encapsulation Techniques: Generic Network Virtualization Encapsulation, VXLAN Generic Protocol Extension, and Network Service Header," White Paper, 2014, Cisco Systems, Inc., San Jose, CA (three pages).
Tom Herbert, "Re: [nvo3] [ippm] [Int-area] encapsulation of IOAM data in various protocols—follow up from WG discussion in London," Apr. 12, 2018, www.mail-archive.com/nvo3@ietf.org/msg05579.html, The Internet Society, Reston, VA, USA (six pages).
Mahalingam et al., "Virtual eXtensible Local Area Network (VXLAN): A Framework for Overlaying Virtualized Layer 2 Networks over Layer 3 Networks," Aug. 2014, RFC 7348, The Internet Society, Reston, VA, USA (twenty-two pages).
Sajassi et al., "BGP MPLS-Based Ethernet VPN," Feb. 2015, RFC 7432, The Internet Society, Reston, VA, USA (fifty-six pages).
J. Touch, "Recommendations on Using Assigned Transport Port Numbers," Aug. 2015, RFC 7605, The Internet Society, Reston, VA, USA (twenty-four pages).
Maino et al., "Generic Protocol Extension for VXLAN," Apr. 30, 2018, draftieff-nvo3-vxlan-gpe-06, The Internet Society, Reston, VA, USA (seventeen pages).
"Cisco Data Center Spine-and-Leaf Architecture: Design Overview," White Paper, 2016, Cisco Systems, Inc., San Jose, CA (twenty-seven pages).
Halpern and Pignataro, "Service Function Chaining (SFC) Architecture," Oct. 2015, RFC 7665, The Internet Society, Reston, VA, USA (thirty-two pages).
Quinn et al., "Network Service Header (NSH)," Jan. 2018, Jan. 2018, RFC 8300, The Internet Society, Reston, VA, USA (forty pages).
Guichard et al., "NSH and Segment Routing Integration for Service Function Chaining (SFC)," Jun. 18, 2018, draft-guichard-sfc-nsh-sr-02, The Internet Society, Reston, VA, USA (fifteen pages).
Kumar et al., "Service Function Simple Offloads," Apr. 2, 2017, draft-ietf-sfc-offloads-00, The Internet Society, Reston, VA, USA (seventeen pages).
"Internet Protocol," Sep. 1981, RFC 791, The Internet Society, Reston, VA, USA (forty-five pages).
Farinacci et al., "Generic Routing Encapsulation (GRE)," Mar. 2000, RFC 2784, The Internet Society, Reston, VA, USA (nine pages).
Brockners et al, "Proof of Transit," Oct. 30, 2016, draft-brockners-proof-of-transit-02, The Internet Society, Reston, VA, USA (twenty-three pages).
Brockners et al., "Proof of Transit," May 7, 2018, draft-brockners-proof-of-transit-05, The Internet Society, Reston, VA, USA (twenty-three pages).
Brockners et al., "Proof of Transit," Oct. 1, 2018, draft-ietf-sfc-proof-of-transit-01, The Internet Society, Reston, VA, USA (twenty-five pages).

* cited by examiner

PROCESSING BEFORE OFFLOAD OR BYPASS

OFFLOAD PROCESSING

BYPASS PROCESSING

PROCESSING BY SFF

LOOKUP TABLES

PROCESSING BY SFF

SERVICE OFFLOAD OR BYPASS INITIATED BY A SERVICE FUNCTION FORWARDER IN A SERVICE FUNCTION CHAINING NETWORK

TECHNICAL FIELD

The present disclosure relates generally to improved processing of packets in a packet switching network, including, but not limited to, service offload or bypass initiated by a service function forwarder (SFF) in a service function chaining (SFC) network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
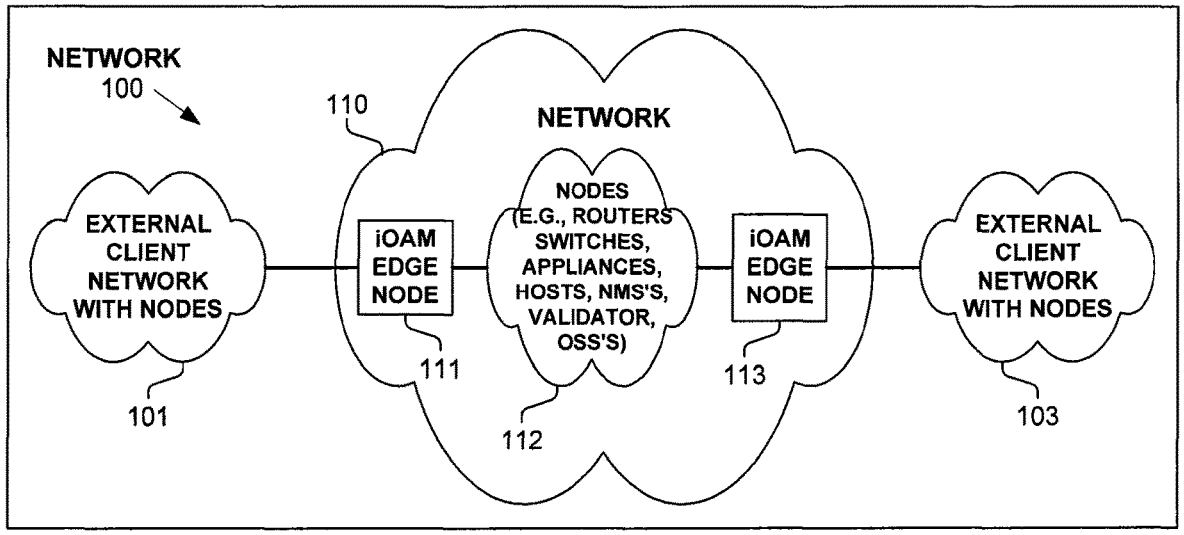
FIG. 1A illustrates a network operating according to one embodiment.

Disclosed are, inter alia, methods, apparatus, computer-storage media, mechanisms, and means associated with service offload or bypass initiated by a service function forwarder (SFF) in a service function chaining (SFC) network.

In one embodiment, a service function forwarder (SFF) receives a particular packet that includes a service function chain (SFC) encapsulation of an original packet, with the SFC encapsulation identifying a particular service function path (SFP) designating a particular service function (SF). Subsequent to extracting pre-service state of the original packet, the SFF forwards the particular packet to the particular SF to apply a particular network service. After the SF applies the particular network service to the original packet, the SFF receives the particular packet that includes post-service state of the original packet. In response to analyzing the pre-service state and post-service state by the SFF, the SFF removes the SF from the particular SFP for subsequently received packets identifying the particular SFP (e.g., the SFF performs service offload or service bypass). In one embodiment, analyzing of the pre-service and post-service states by the SFF identifies particular packet processing performed by the SFP on the original packet, and in response, the SFF packet processes a subsequently received packets of the particular SFP based on said identified particular packet processing (e.g., the SFF performs service offload). In one embodiment, the particular network service is Transmission Control Protocol (TCP) Optimization, Firewall, or Network Address Translation.

In one embodiment, the SFF adds said pre-service state in an In-Situ Operations, Administration, and Maintenance (IOAM) data field of the particular packet prior to said forwarding the particular packet to the particular SF; wherein the particular packet, when said received by the SFF after the SF said applied the particular network service, includes said added pre-service state. The IOAM data field is typically included in a header of the SFC encapsulation, such as, but not limited to, a Network Service Header (NSH) or Segment Routing Header.

In one embodiment, the SFF locally stores the pre-service state prior to forwarding the particular packet to the particular SF; and the SFF retrieves this locally stored pre-service state prior to analyzing the pre-service and post-service states.

2. Example Embodiments

Disclosed are, inter alia, methods, apparatus, computer-storage media, mechanisms, and means associated with service offload or bypass initiated by a service function forwarder (SFF) in a service function chaining (SFC) network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

As used herein, a "data packet" refers to a standard packet communicating information (such as a customer data packet), with a probe packet (e.g., test packet) not being included in the definition of a data packet.

As used herein, "operations data" refers to operations, administration, maintenance (OAM) and/or provisioning (OAM-P) information (e.g., including operational and telemetry information), such as, but not limited to, in-band OAM data, or more specifically, In-Situ OAM Data. In one embodiment, the operations data is raw data, processed data, and/or data resulting from processing of other information.

In one embodiment, the operations data is related to data-plane and/or control-plane processing in the network (e.g., in a portion of, or the entire network). In one embodiment, the operations data is related to communication (including, but not limited verifying and/or discovering a path taken and/or performance measurement data or results) and/or other processing of packet(s) in a network. In one embodiment, the operations data is related to process(es), hardware, link(s), and/or other resources of one or more elements in the network (e.g., node(s), router(s), packet switching device(s), network management or other control system(s), host(s), server(s), apparatus, application processor(s), service devices(s), application processor(s), transmission and/or communications equipment). In one embodiment, operations data includes information related to the communication of a packet through a network, other protocol layer processing, and/or same layer processing.

In one embodiment, the operations data encompasses data related to one or more underlay protocols/networks. In one embodiment, the operations data encompasses data related to one or more overlay protocols/networks.

FIG. 1A illustrates a network 100 (e.g., an aggregation of one or more networks of one or more different entities) operating using multiple protocol layers in processing packets (e.g., using overlay and underlay protocols/networks) according to one embodiment. As shown, network 100 includes client networks 101 and 103 (which are the same network in one embodiment) communicatively coupled to a provider network 110. In one embodiment, network 110 uses Segment Routing (SR), Multiprotocol Label Switching (MPLS), tunnels, Ethernet VPN (EVPN), Provider Backbone Bridging EVPN (PBB-EVPN), Internet Protocol version 4 and/or 6 (IP), and/or other encapsulating and/or packet forwarding technology.

In one embodiment, provider network 110 includes provider edge nodes 111 and 113, and a network 112 of network nodes, gateways, service functions, hosts (e.g., end nodes), network management, operations support systems, service functions, service function forwarders, other service function chaining nodes, etc. In one embodiment, provider edge nodes 111 and 113 process packets received from networks 101 and 103, which may include encapsulating or otherwise processing these packets into Segment Routing packets such as by adding a SR header (and possibly another IP header) to these packets according to a data plane ascertained Segment Routing policy, and subsequently decapsulating or removing a Segment Routing header (and possibly another IP header) and forwarding the native (e.g., IP) packets into network 101 and 103. In one embodiment, edge nodes 111 and 113 perform ingress and egress processing of packets, including adding and extracting operations data fields and operations data to packets.

Figure 1B:
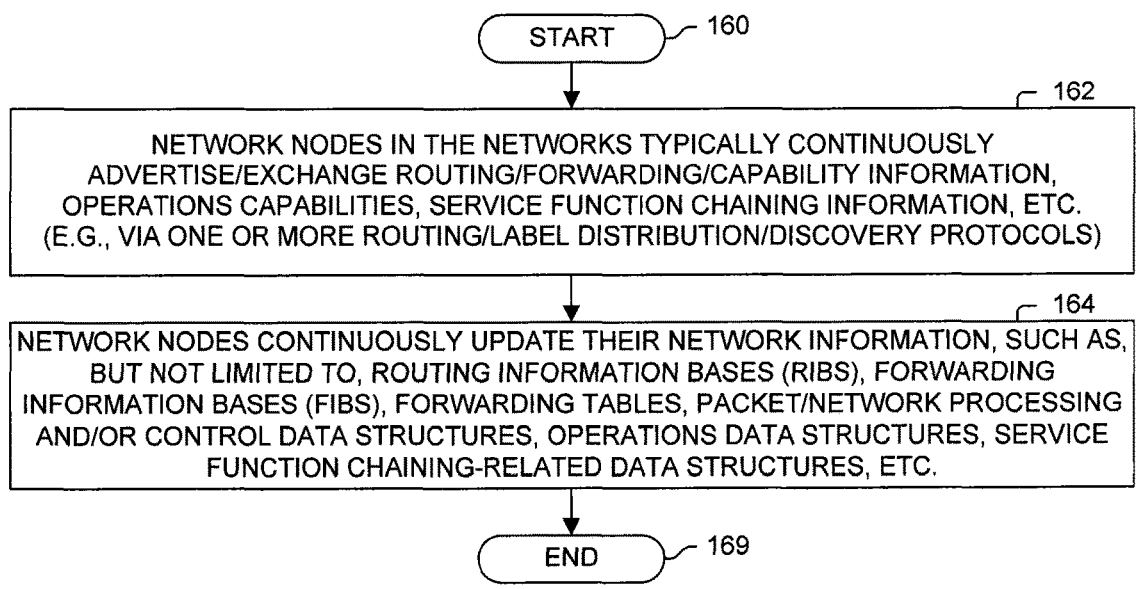
FIG. 1B illustrates a process according to one embodiment.

FIG. 1B illustrates a process according to one embodiment associated with service offload or bypass initiated by a service function forwarder (SFF) in a service function chaining (SFC) network. Processing begins with process block 160. In process block 162, network nodes in the networks typically continuously advertise/exchange routing, forwarding, capability and information (e.g., including operations capabilities), service function chaining information, etc., via one or more routing, label distribution, discovery, signaling and/or other control-plane protocols. In process block 164, the network nodes continuously update their network information, such as, but not limited to, Routing Information Bases (RIBs), Forwarding Information Bases (FIBS), forwarding tables, service function chaining-related data structures, packet/network processing and/or control data structures, operations data structures, etc. Processing of the flow diagram of FIG. 1B is complete as indicated by process block 169.

Figure 2A:
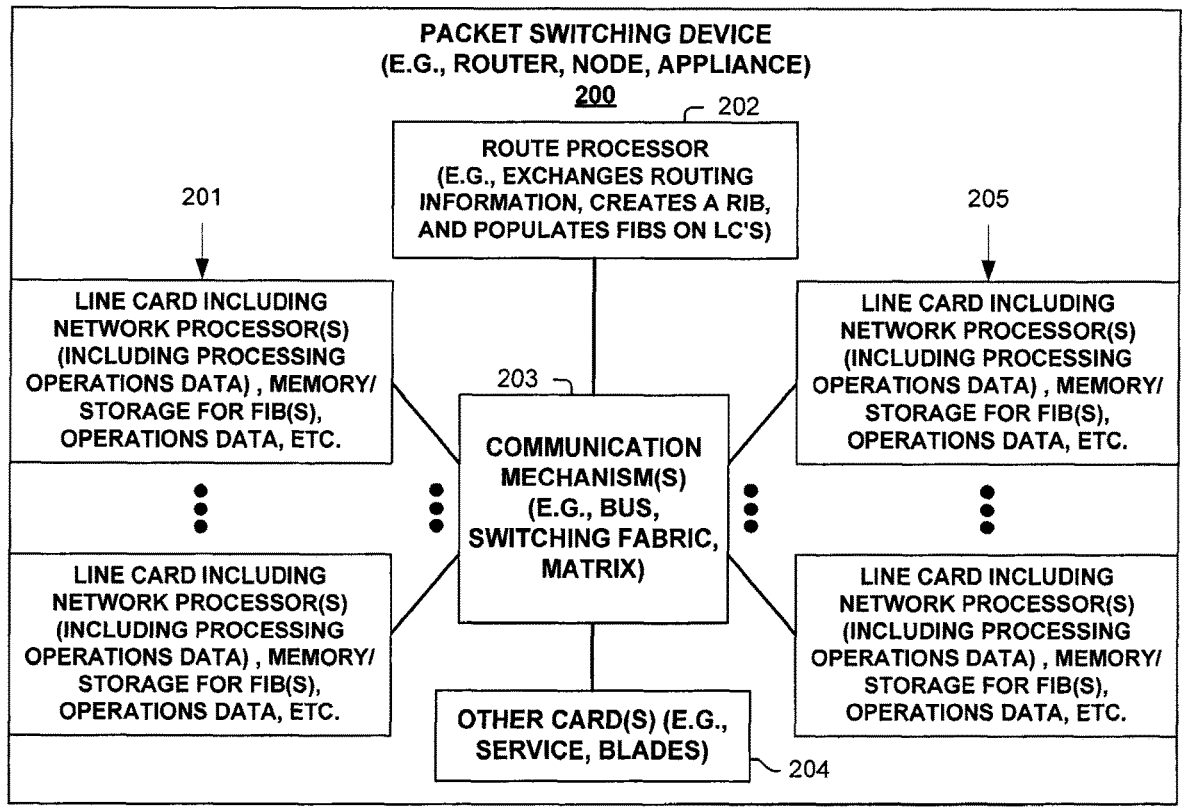
FIG. 2A illustrates a packet switching device according to one embodiment.
Figure 2B:
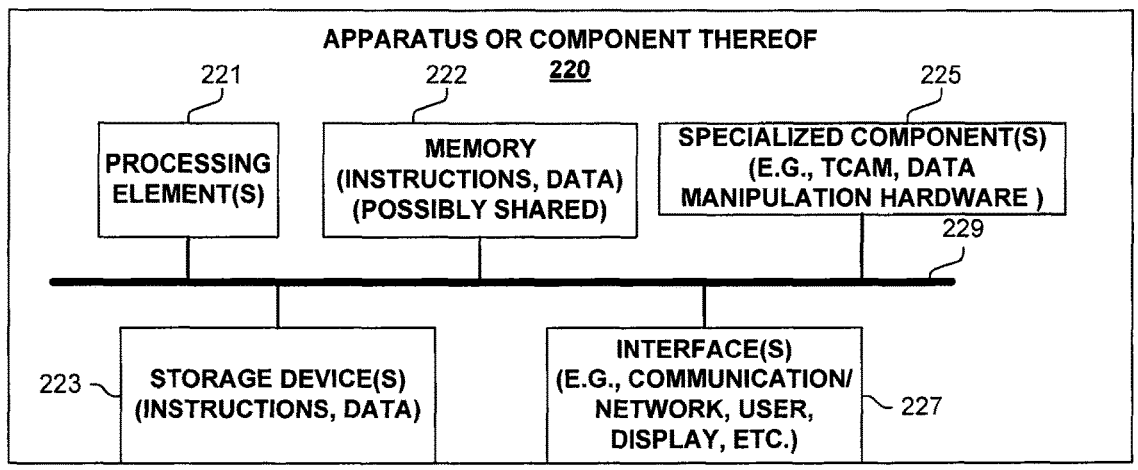
FIG. 2B illustrates an apparatus or component thereof according to one embodiment.

FIGS. 2A-B and their discussion herein provide a description of various network nodes according to one embodiment.

FIG. 2A illustrates one embodiment of a packet switching device 200 (e.g., router, node, switching, appliance, gateway) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with service offload or bypass initiated by a service function forwarder (SFF) in a service function chaining (SFC) network. Packet switching device 200 also has a control plane with one or more processing elements (e.g., Route Processor(s)) 202 for managing the control plane and/or control plane processing of packets as associated with service offload or bypass initiated by a service function forwarder (SFF) in a service function chaining (SFC) network. Packet switching device 200 also includes other cards 204 (e.g., service cards, blades) which include processing elements that are used in one embodiment to process (e.g., forward/send, drop, manipulate, change, modify, receive, create, duplicate, perform operations data processing functionality, apply a service according to one or more service functions) packets associated with service offload or bypass initiated by a service function forwarder (SFF) in a service function chaining (SFC) network, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, operations data processing and storage functions are implemented on line cards 201, 205.

FIG. 2B is a block diagram of an apparatus 220 (e.g., host, router, node, destination, or portion thereof) used in one embodiment associated with service offload or bypass initiated by a service function forwarder (SFF) in a service function chaining (SFC) network. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup, packet processing (including Segment Routing processing) and/or service function operations; associative memory; binary and/or ternary content-addressable memory; Application Specific Integrated Circuit(s), cryptographic hash hardware, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
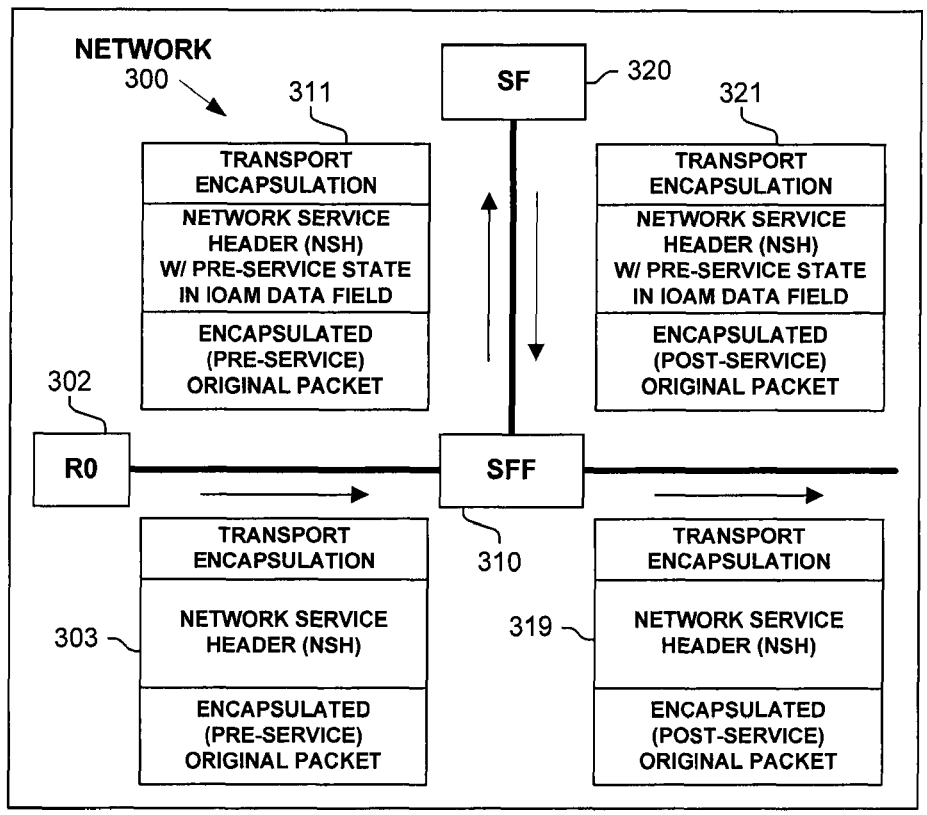
FIG. 3A illustrates a network operating according to one embodiment.

FIG. 3A illustrates a network 300 operating, according to one embodiment, in which service function (SF) 320 applies a network service to original packets received in particular packets including a service function chain (SFC) encapsulation of the original packets. As shown, network 300 includes node RO (302), service function forwarder (SFF) 310, and service function (SF) 320. Also, the same packet is denoted 303, 311, 321, and 319 as it progresses through network 300.

As shown, RO (302) forwards particular packet 303 to SFF 310, with the particular packet 303 including an SFC encapsulation of an original packet, the SFC encapsulation identifying a particular service function path (SFP) that designates processing by SF 320. SFF 310 adds pre-service state of the original packet to an In-Situ Operations, Administration, and Maintenance (IOAM) data field of received particular packet 303 and then sends packet 311 to SF 320. In one embodiment, SFF 310 inserts an IOAM header resulting in particular packet 311 and then subsequently removes the inserted IOAM header from particular packet 321 resulting in particular packet 319. In one embodiment, SFF 310 uses an IOAM header already in received particular packet 303, and then removes the added pre-service state before sending particular packet 319 (with the IOAM header as first received by SFF 310) into the network. In one embodiment with SFF 310 being the last SFF in the SFC and after the network service has been applied to the pre-service original packet, the SFC encapsulation is removed with the post-service original packet sent into network 300.

In response to analyzing the obtained pre-service state and post-service state, SFF 310 determines to remove SF 320 from the particular SFP for a plurality of subsequently received packets identifying the particular SFP (e.g., those received packets with the SFC's Service Path Identifier (SPI) and Service Index (SI)). Thus, SFF 10 has determined to initiate and perform service bypass or service offload for corresponding packets.

Figure 3B:
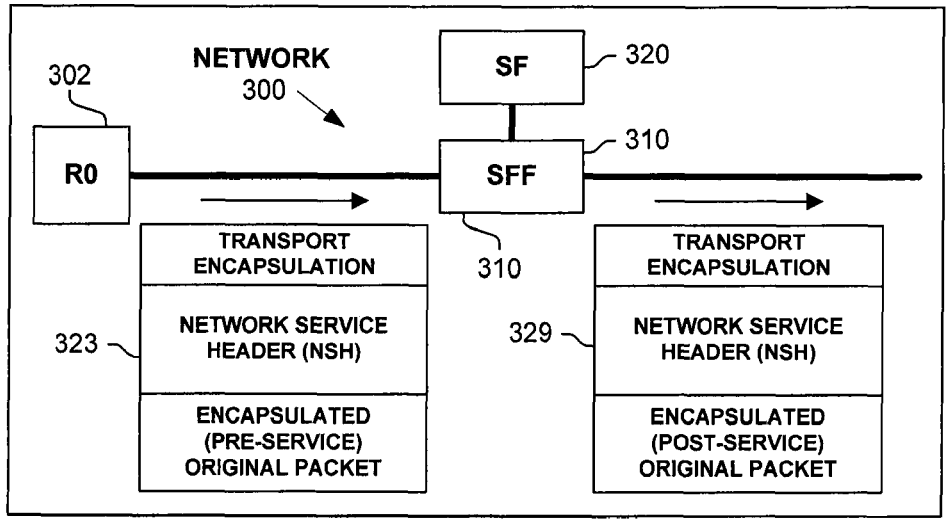
FIG. 3B illustrates a network operating according to one embodiment.

FIG. 3B illustrates such service offload performed by one embodiment of SFF 310 in network 300. Service offload refers to an SFF, in place of a SF, applying a particular network service to an original packet. As shown, RO (302) forwards particular packet 323 to SFF 310, with the particular packet 323 including an SFC encapsulation of an original packet (before the network service is applied), the SFC encapsulation identifying a particular service function path (SFP) that would have caused a particular network service to be applied to the encapsulated original packet by SF 320. SFF 310 performs one or more lookup operations in locally stored data structure(s) and identifies to perform service bypass, with SFF 310 applying the particular network to the original packet, and sends particular packet 329 (including the encapsulated post-service original packet) into network 300. In one embodiment with SFF 310 being the last SFF in the SFC and after the network service has been applied to the pre-service original packet, the post-service original packet is sent into network 300 without the SFC encapsulation.

Figure 3C:
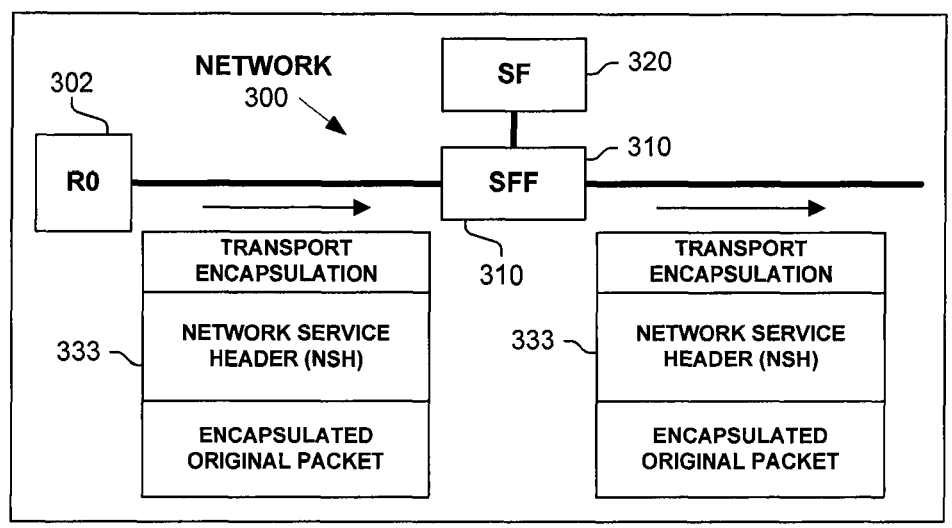
FIG. 3C illustrates a network operating according to one embodiment.

FIG. 3C illustrates such service bypass performed by one embodiment of SFF 310 in network 300. Service bypass refers to not applying a particular network service to an original packet, as the application of such network service would not modify the original packet (thus, effectively a special case of service offload).

As shown, RO (302) forwards particular packet 333 to SFF 310, with the particular packet 333 including an SFC encapsulation of an original packet, the SFC encapsulation identifying a particular service function path (SFP) that would have caused a particular network service to be applied to the encapsulated original packet by SF 320 (which would not have modify the original packet encapsulated in particular packet 333). SFF 310 performs one or more lookup operations in locally stored data structure(s) and identifies to perform service offload, with SFF 310 correspondingly sending particular packet 333 into network 300. In one embodiment with SFF 310 being the last SFF in the SFC, the SFC encapsulation is removed with the original packet sent into network 300.

Figure 4A:
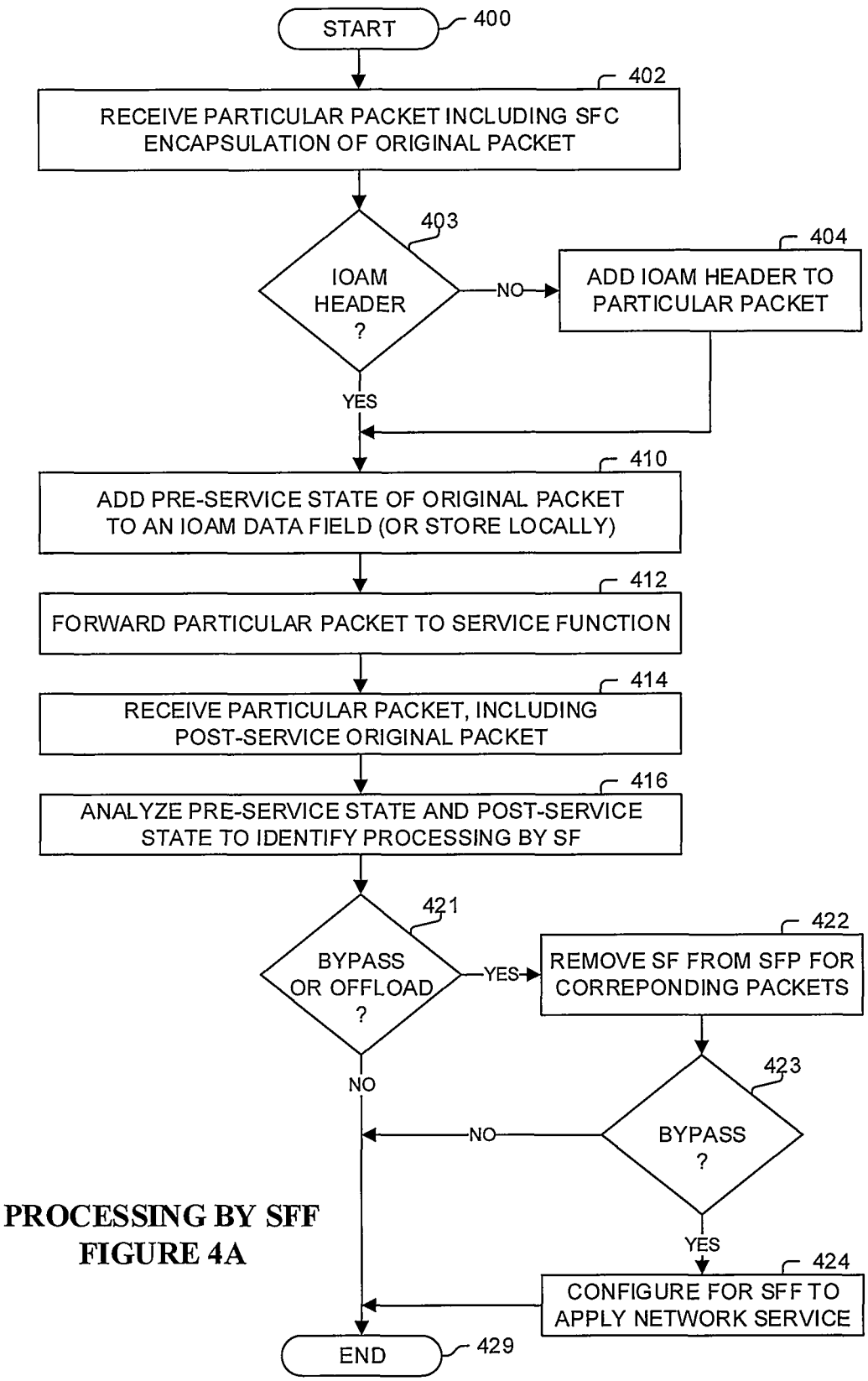
FIG. 4A illustrates a process according to one embodiment.

FIG. 4A illustrates a process performed in one embodiment. Processing beings with process block 400. In process block 402, a SFF receives a particular packet including SFC encapsulation of an original packet. As determined in process block 403, if the received particular packet does not include an IOAM header that can be used for storing pre-service state information, then processing proceeds to process block 404 that adds an IOAM header to the particular packet.

Processing continues to process block 410, wherein pre-service state of the original packet is added to an IOAM data field of the IOAM header. In one embodiment, the SFF stores the pre-service data locally in a data structure. In process block 412, the particular packet is forwarded to the SF. In process block 414 and after the network service has been applied by the SF, the particular packet is received by the SFF. The received particular packet includes the post-service original packet. In process block 416, the pre-service state and post-service state of the original packet are analyzed by the SFF to identify the processing performed by the SF. As determined in process block 421, if the analysis determines to perform service bypass or service offload, then processing proceeds to process block 422; otherwise processing proceeds to process block 429.

In process block 422, the SF is removed from the SFP for corresponding packets. As determined in process block 423, if the SFF determined a service bypass operation, then in process block 424, the SFF configures itself to perform the service bypass and processing proceeds to process block 429; otherwise, processing proceeds directly to process block 429.

In one embodiment, the SFF is analyzes the pre-service state and post-service state information that is relevant to, and in the context of, the network service to be performed on the original packet by the SF. In one embodiment and in the context of a network address translation network service, the SFF populates a data structure that maps the pre-service (internal) source address and/or port of the original packet to the post-service (external) source address and/or port. In one embodiment and in the context of a network address translation network service, the SFF populates a data structure that map the pre-service (external) destination address and/or port of the original packet to the post-service (internal) destination address and/or port. In one embodiment and in the context of Transmission Control Protocol (TCP) Optimization or Firewall, the SFF populates a data structure to cause service bypass when there would be no change to the relevant pre-service state of the original packet by the application of the network service.

Further, by the SFF obtaining and analyzing the pre-service and post-service states (rather than only reacting to a specific bypass or offload request from the SF), the SFF can offload and bypass network services for a SF that does not support service offload or bypass and/or a SF that does not use bypass/offload signaling that is compatible with the SFF or with the particular service encapsulation of the particular packet. Thus in one embodiment, initiation of service offload and service bypass by a SFF is transparent to the SF. Further, IOAM headers and data fields are defined for an extensive set of protocols that typically are used in the service encapsulation of the particular packet. By including the pre-service state in an IOAM header or data field, the SFF readily matches pre-service and post-service states (for analysis) of an original packet as they are both in the returned service function chain (SFC) encapsulation used by the particular packet.

Continuing in process block 429, processing of the flow diagram of FIG. 4A is complete as indicated by process block 429.

Figure 4B:
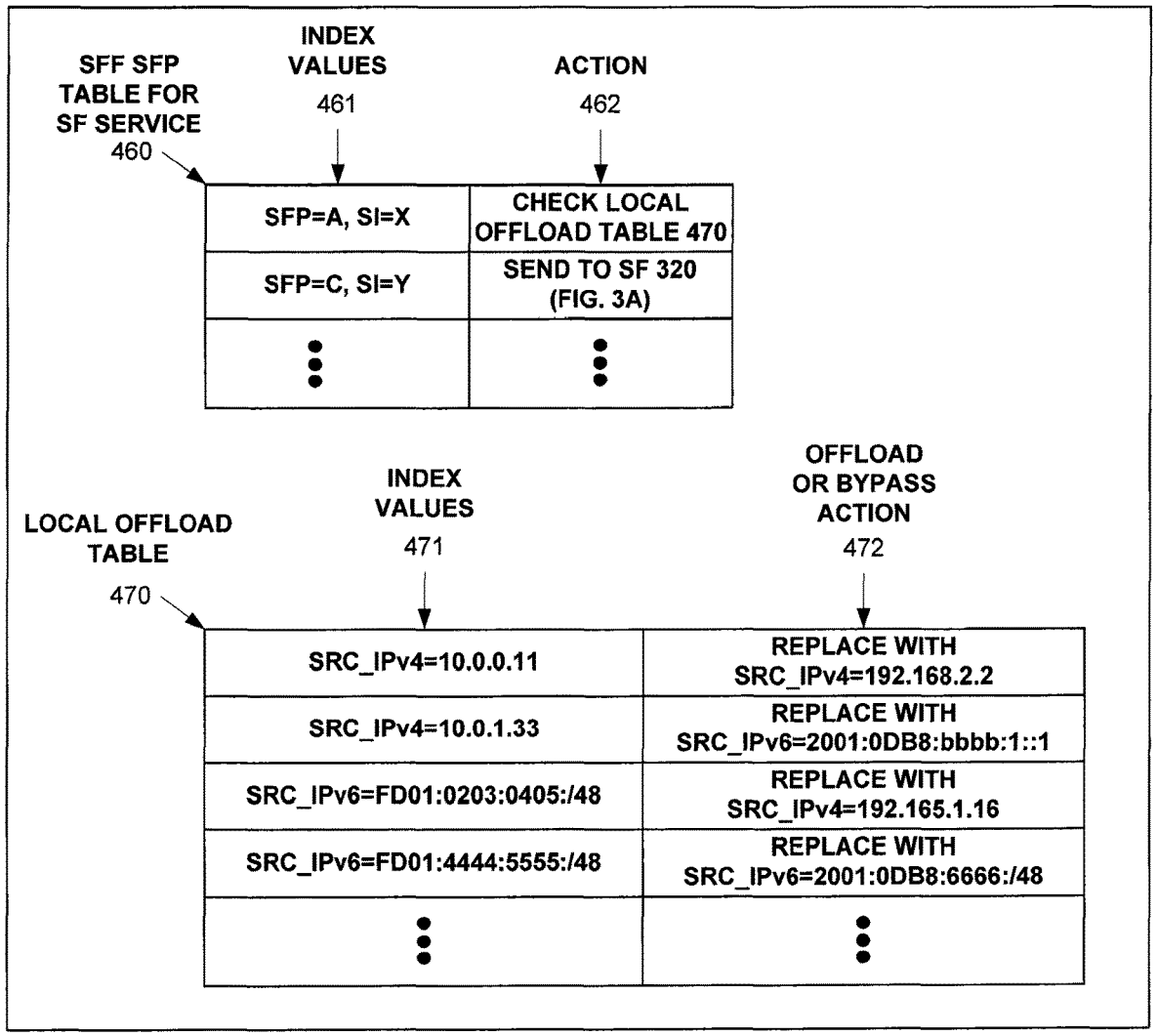
FIG. 4B illustrates data structures used in one embodiment.

FIG. 4B illustrates a SFF SFP table 460 used by a SFF in one embodiment. As shown, an action (462) is determined by performing a lookup operation on index values (461). In one embodiment, a lookup operation is performed on index values (461) using keys of a Service Path Identifier (SPI) and Service Index (SI) received in the particular packet. As shown, a lookup operation for SPI=C and SI=Y against index values (461), results in an action (462) of forwarding the packet to SF 320 (shown in FIG. 3A). As shown, a lookup operation for SPI=A and SI=X against index values (461), results in an action (462) of checking local offload table 470.

Local offload table 470 includes Network Address Translation (NAT) entries for translating addresses (and/or ports in one embodiment), including from, but not limited to, IPv4 to IPv4, IPv4 to IPv6, IPv6 to IPv4, and IPv6 to IPv6.

In one embodiment, a lookup operation is then performed in local offload table 470 using a key of the source IP address (e.g., 10.0.0.11) of the original packet against index values (471), resulting in the offload or bypass action (472). For the source IP address of 10.0.0.11, action (472) is replace the source IP address of the original packet with the IP address of 192.168.2.2.

Figure 4C:
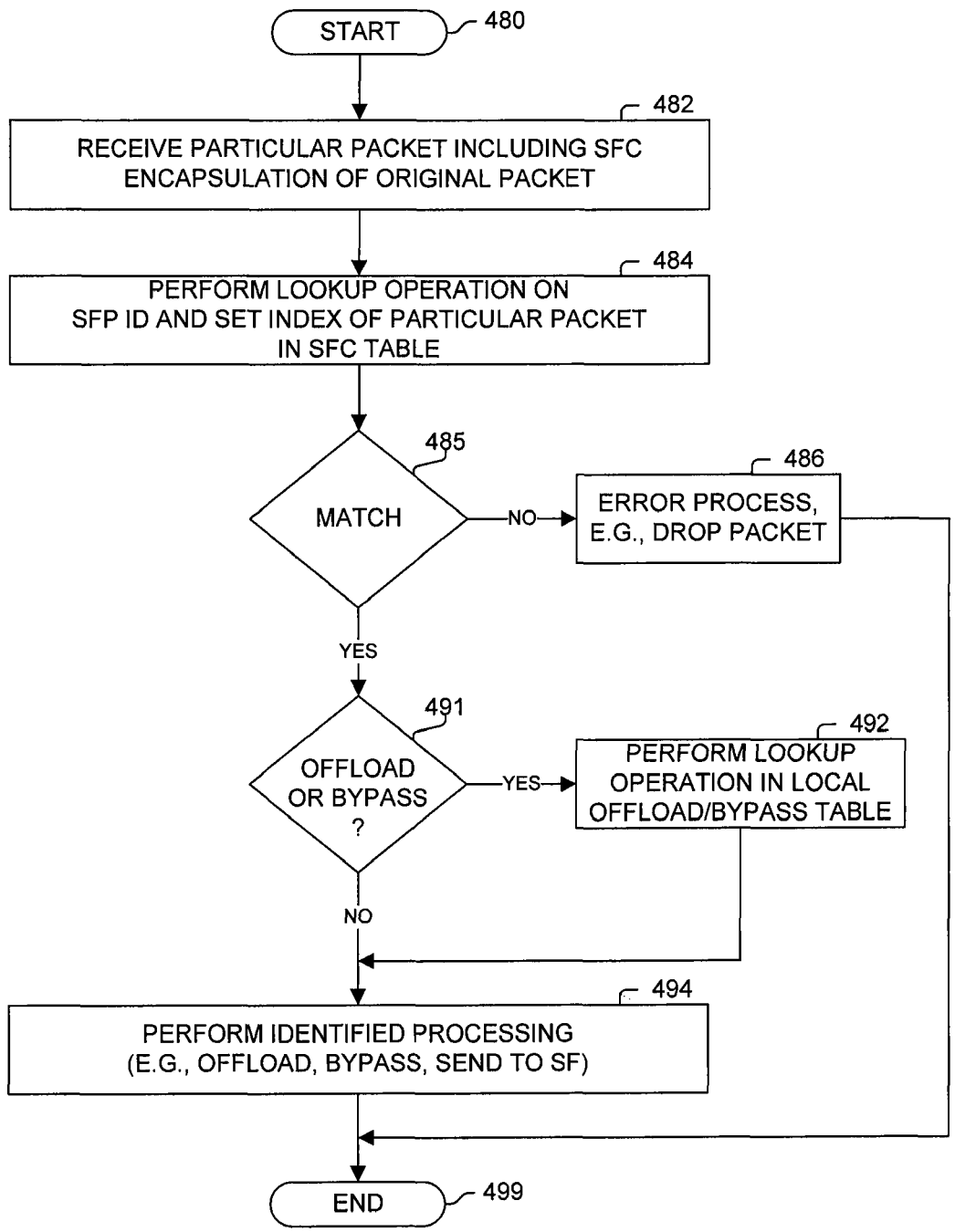
FIG. 4C illustrates a process according to one embodiment.

FIG. 4C illustrates a process performed in one embodiment. Processing beings with process block 480. In process block 482, a SFF receives a particular packet including SFC encapsulation of an original packet. In process block 484, a lookup operation is performed in a SFP table based on the Service Path Identifier (SPI) and Service Index (SI) of the received particular packet. As determined in process block 485, if a match is found, processing proceeds to process block 491; otherwise, processing proceeds to process block 486.

In process block 486, error processing is performed, such as, but not limited to, dropping the packet and/or performing other remedial processing. Processing proceeds to process block 499.

As determined in process block 491, if an overload or bypass action is determined, then processing proceeds to process block 492; otherwise processing proceeds directly to process block 494.

In process block 492, a lookup operation is performed in a local offload/bypass table based on value(s) obtained from the original packet that correspond to the processing to be performed. Processing continues to process block 494.

In process block 494, the identified processing is performed (e.g., bypass, offload, send to a SF). Processing continues to process block 499.

Continuing in process block 499, processing of the flow diagram of FIG. 4C is complete as indicated therein.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   receiving a particular packet by a service function forwarder (SFF), with the particular packet including a service function chain (SFC) encapsulation of an original packet, with the original packet including pre-service state information, the SFC encapsulation identifying a particular service function path (SFP) designating a particular service function (SF);
   subsequent to acquiring said pre-service state information of the original packet and responsive to said designated particular SF, the SFF forwarding the particular packet encapsulating the original packet to the particular SF to apply a particular network service, with the original packet including said pre-service state information;
   after the SF applies the particular network service to the original packet, the SFF receiving the particular packet encapsulating the original packet, with the original packet including post-service state information of the original packet, and
   in response to analyzing said pre-service state information and said post-service state information by the SFF, the SFF removing the SF from the particular SFP for a plurality of subsequently received packets identifying the particular SFP.

2. The method of claim 1, comprising the SFF adding said pre-service state information to an In-Situ Operations, Administration, and Maintenance (IOAM) data field of the particular packet prior to said forwarding the particular packet to the particular SF; wherein the particular packet, when said received by the SFF after the SF said applied the particular network service, includes said pre-service state information.

3. The method of claim 2, wherein said IOAM data field is in a header of the SFC encapsulation.

4. The method of claim 3, wherein said IOAM data field is in a Network Service Header (NSH) of the SFC encapsulation.

5. The method of claim 4, wherein said pre-service state information is added to an In-Situ Operations, Administration, and Maintenance (IOAM) Type-Length-Value (TLV).

6. The method of claim 1, comprising the SFF adding said pre-service state information of the original packet to a Segment Routing (SR) Internet Protocol version 6 Extension Header (SRv6 header) prior to said forwarding the particular packet to the particular SF.

7. The method of claim 6, wherein said pre-service state information is added to an In-Situ Operations, Administration, and Maintenance (IOAM) Type-Length-Value (TLV).

8. The method of claim 1, comprising: the SFF locally storing in the SFF said pre-service state information prior to said forwarding the particular packet to the particular SF; and the SFF retrieving said locally stored pre-service state information prior to said analyzing said pre-service state information and said post-service state information.

9. The method of claim 1, wherein the particular network service is Transmission Control Protocol (TCP) Optimization.

10. The method of claim 1, wherein the particular network service is Firewall.

11. The method of claim 1, wherein said analyzing said pre-service state information and said post-service state information by the SFF identifies particular packet processing performed by the SFP on the original packet; and
   wherein the method comprises the SFF packet processing a subsequently received plurality of packets of the particular SFP based on said identified particular packet processing.

12. The method of claim 11, comprising the SFF adding said pre-service state information to an In-Situ Operations, Administration, and Maintenance (IOAM) data field of the particular packet prior to said forwarding the particular packet to the particular SF; wherein the particular packet, when said received by the SFF after the SF said applied the particular network service, includes said added pre-service state information.

13. The method of claim 12, wherein said IOAM data field is in a Network Service Header (NSH) of the SFC encapsulation.

14. The method of claim 12, wherein said IOAM data field is in a Segment Routing (SR) Internet Protocol version 6 Extension Header (SRv6 header).

15. The method of claim 12, wherein the particular network service is network address translation;
   wherein said analyzing said pre-service state information and said post-service state information by the SFF identifies particular packet processing by the SF of changing a particular source address of the original packet to a new source address; and
   wherein the method comprises the SFF packet processing a subsequently received plurality of encapsulated original packets having the particular source address to having the new source address, wherein each of the subsequently received plurality of encapsulated original packets identifies the particular SFP.

16. The method of claim 11, wherein the particular network service is network address translation;
   wherein said analyzing said pre-service state information and said post-service state information by the SFF identifies particular packet processing by the SF of changing a particular source address of the original packet to a new source address; and
   wherein the method comprises the SFF packet processing a subsequently received plurality of encapsulated original packets having the particular source address to having the new source address, wherein each of the subsequently received plurality of encapsulated original packets identifies the particular SFP.

17. The method of claim 11, comprising: the SFF locally storing in the SFF said pre-service state information prior to said forwarding the particular packet to the particular SF; and the SFF retrieving said locally stored pre-service state information prior to said analyzing said pre-service state information and said post-service state information.

18. A service function forwarder (SFF) in a network, comprising:

one or more processors;
memory;
one or more interfaces sending and receiving packets; and
wherein said one or more processors perform operations including:
processing a particular packet received on said one or more interfaces, with the particular packet including a service function chain (SFC) encapsulation of an original packet, with the original packet including pre-service state information, and the SFC encapsulation identifying a particular service function path (SFP) designating a particular service function (SF);
subsequent to acquiring said pre-service state information of the original packet, causing the particular packet to be forwarded via said one or more interfaces to the particular SF to apply a particular network service;
after the SF applies the particular network service to the original packet, receiving the particular packet including post-service state information of the original packet via said one or more interfaces, and
responsive to analyzing said pre-service state information and said post-service state information, said one or more processors removing the SF from the particular SFP for a plurality of packets identifying the particular SFP and received via said one or more interfaces.

19. The SFF of claim 18, wherein said operations include adding said pre-service state information to an In-Situ Operations, Administration, and Maintenance (IOAM) data field of the particular packet prior to said forwarding the particular packet to the particular SF; wherein the particular packet, when said received by the SFF after the SF said applied the particular network service, includes said added pre-service state information.

20. The SFF of claim 19, wherein said analyzing said pre-service state information and said post-service state information identifies particular packet processing performed by the SFP on the original packet; and
wherein said operations include packet processing a subsequently received plurality of packets of the particular SFP based on said identified particular packet processing; wherein said received plurality of packets are received by the SFF via said one or more interfaces.

* * * * *